United States Patent
Lutter et al.

(10) Patent No.: US 12,411,820 B2
(45) Date of Patent: Sep. 9, 2025

(54) DOWNTIME-MINIMIZED DATABASE VERSION DEPLOYMENT

(71) Applicant: SAP SE, Walldorf (DE)

(72) Inventors: Christian Lutter, Karlsruhe (DE); Welf Walter, Waghausel (DE); Volker Driesen, Heidelberg (DE)

(73) Assignee: SAP SE, Walldorf (DE)

( * ) Notice: Subject to any disclaimer, the term of this patent is extended or adjusted under 35 U.S.C. 154(b) by 2 days.

(21) Appl. No.: 18/187,261

(22) Filed: Mar. 21, 2023

(65) Prior Publication Data

US 2024/0320198 A1 Sep. 26, 2024

(51) Int. Cl.
G06F 16/00 (2019.01)
G06F 16/21 (2019.01)

(52) U.S. Cl.
CPC .......... G06F 16/214 (2019.01); G06F 16/213 (2019.01)

(58) Field of Classification Search
CPC .............................. G06F 16/214; G06F 16/213
USPC .................................................. 707/703, 803
See application file for complete search history.

(56) References Cited

U.S. PATENT DOCUMENTS

| 2014/0143284 A1* | 5/2014 | McCaffrey ............ G06F 16/213 707/803 |
| 2016/0085777 A1* | 3/2016 | Engelko ................ G06F 16/211 707/803 |
| 2019/0018670 A1* | 1/2019 | Ramasamy ......... H04L 41/5041 |
| 2021/0081372 A1* | 3/2021 | Lee ........................ G06F 9/4411 |

* cited by examiner

*Primary Examiner* — Raquel Perez-Arroyo
(74) *Attorney, Agent, or Firm* — Buckley, Maschoff & Talwalker LLC

(57) ABSTRACT

Systems and methods include determination of a plurality of artifacts of a first data schema and a first view schema of a first database version to be updated in a second database version, determination of target structures of a plurality of runtime objects for the second database version based on the artifacts, and loading of current structures of the runtime objects into a runtime buffer of a first work process connected to the first view schema. While the first work process serves first incoming requests using the runtime buffer and the first view schema, the runtime objects are updated to the determined target structures in the first data schema and in a second view schema of the second database version, a second work process is connected to the second view schema, and the second work process serves second incoming requests, the second view schema and the updated first data schema.

18 Claims, 9 Drawing Sheets

DOWNTIME-MINIMIZED DATABASE VERSION DEPLOYMENT

BACKGROUND

Conventional enterprises utilize many software applications to facilitate their operations. New versions of these applications are developed from time-to-time, which may include new features, optimizations and/or bug fixes. These versions may require changes to, i.e., new versions of, an underlying database which stores data accessed by the applications.

For example, conventional application update procedures deploy new or updated application content to the database. Such content may include new configurations, table structures, views, code, role definitions, user interface (UI) definitions, text, etc. Once the application content is deployed in full, users are switched to use the new database version.

The deployment of new or updated application content typically requires many changes to the database structure and modification of the content of several tables. Accordingly, the deployment of new or updated application content cannot be completed in one database transaction. Attempting such deployment during operation will result in the intermediate status of deployed changes to be visible to users. If a user is confronted with a partially-deployed change (e.g., code, database artifacts or portions thereof), the application will likely not work as defined.

Conventionally, are performed during a downtime period in which the application to be updated is taken offline and is therefore unavailable to users. However, modern applications are typically offered as a Software-as-a-Service (SaaS) solution and simultaneously consumed by a number of different organizations. It is therefore desirable to perform application and database updates while imposing minimal (or zero) application downtime on users.

Recent techniques are able to update a database to a new version while the database is running (i.e., serving incoming user requests). These techniques create clones of the tables which are changed by the update and deploy the application content to the cloned tables. Once all the application content is deployed, incoming user requests are switched to the updated application, which accesses the now-updated cloned tables.

Cloning all of the tables to be updated may require an unsuitable amount of time. For example, long deployment durations may hinder the goal of a Continuous Improvement/Continuous Development (CI/CD) approach which foresees deployment of a new application version several times per day. Not only is the deployment frequency limited due to the duration of table cloning-based deployment, but other changes are also potentially blocked during this duration such as customer creation of application extensions.

Moreover, cloning the affected tables requires additional memory and resources. Generally, a cloned table doubles the amount of memory (e.g., Random Access Memory (RAM), disk) required for the table, and may require even more memory if a high-availability mirror storage system is implemented. Cloning also requires the reading and writing of large amounts of data. Since it is desirable to not degrade performance of the application during deployment, additional hardware resources are required to support both the cloning and normal execution of the application. These additional hardware resources may be added temporarily or provided long-term as a buffer, but either approach imposes additional costs.

Systems are desired for updating a database to a new version while providing low or no downtime and minimizing database table cloning.

DETAILED DESCRIPTION

The following description is provided to enable any person in the art to make and use the described embodiments. Various modifications, however, will remain readily-apparent to those in the art.

Some embodiments provide a system to efficiently deploy a target database version while minimizing downtime and required computing resources. Generally, embodiments establish two work process-specific application server runtime buffers, one of which is configured to operate in conjunction with a current database version and the other of which is configured to operate with the target database version. Users accessing the work process connected to the view layer of the current database version are then migrated to the work process connected to the view layer of the target database version. Once users are no longer accessing the work process connected to the view layer of the current database version, that work process is re-connected to the view layer of the target database version.

Embodiments facilitate the deployment of a target database version without disruption, long lead times, or significant resource consumption. Embodiments may avoid requiring overhead time to create a view layer for the target database version during the deployment and avoid the need to clone many tables. Disruptions are minimized by enabling simultaneous usage of current and target database versions by different users and individual switching of users to the target database version.

Figure 1:
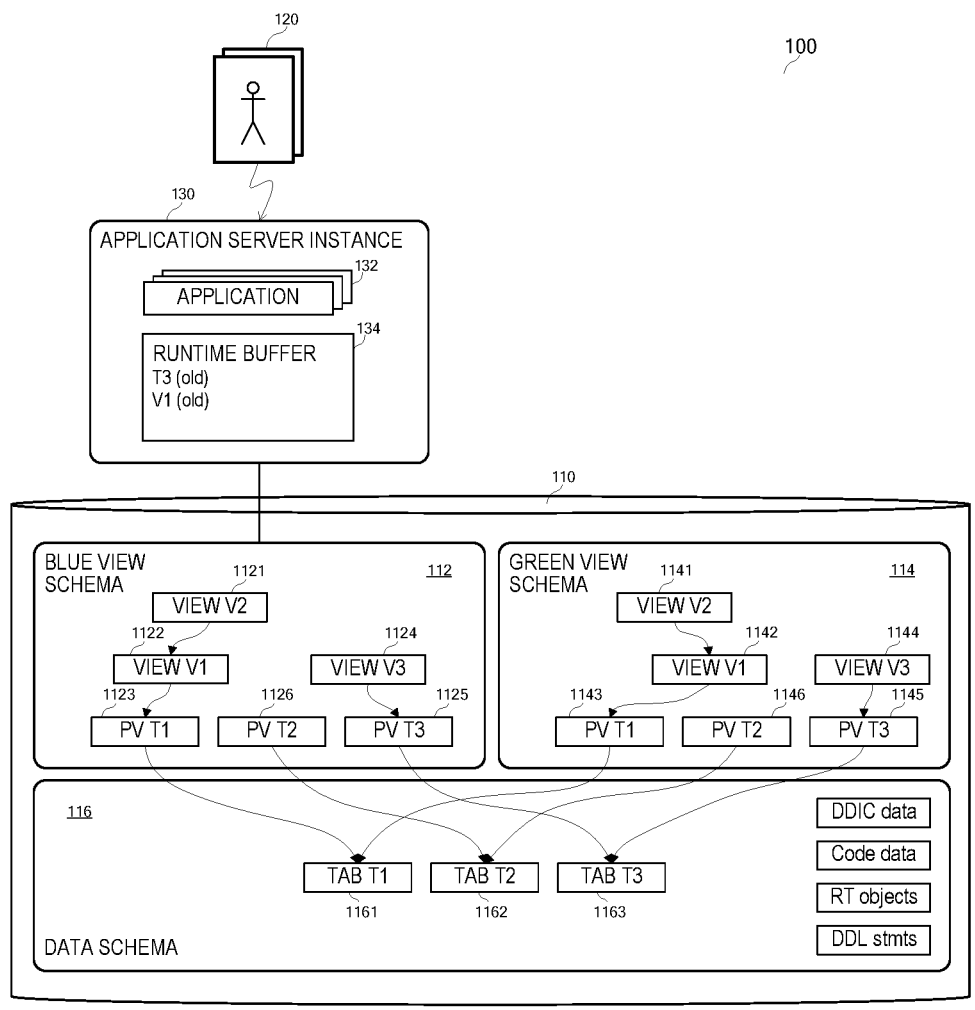
FIG. 1 illustrates operation of an application prior to deployment of a target database version according to some embodiments.

FIG. 1 illustrates system 100 operating a current database version prior to deployment of a target database version including new and updated application content according to some embodiments. The illustrated components may be implemented using any suitable combinations of computing hardware and/or software that are or becomes known. Such combinations may include cloud-based implementations in which computing resources are virtualized and allocated elastically. In some embodiments, two or more components are implemented by a single computing device.

Persistency 110 may comprise a database system as is known in the art. Persistency 110 may comprise a single node or distributed database system, and may be implemented using hardware such as but not limited to an on-premise computer server or a cloud-based virtual machine. Persistency 110 may be managed by program code of a query-responsive database management system (DMBS). According to some embodiments, persistency 110 is an "in-memory" database, in which all data is loaded into memory upon startup and requested changes are made thereto. The changed data is flushed from time-to-time to move older data versions from memory to persistent storage (not shown) or to persist a database snapshot to persistent storage.

Persistency 110 stores database tables 1161, 1162 and 1163 within data schema 116. The database tables of data schema 115 conform to a logical data model as is known in the art. The logical data model may be specified by a developer of an application which is intended to access the database tables. The application content may include configurations, code, role definitions, UI definitions, text, etc. Data schema 115 includes other unshown tables storing application content of current application 132.

"Blue" view schema 112 includes views on the database tables within data schema 116. View schema 112 includes SQL views 1121, 1122 and 1124 which may comprise views on one or more underlying database tables and/or other views. Projection views 1123, 1125 and 1126 are simple views on a corresponding database table 1161, 1163 and 1162, which may omit one or more non-key fields of their underlying database table. View schema 112 may also store program code of database procedures and other artifacts as in known in the art.

Application server instance 130 comprises processor-executable program code executed within any suitable execution environment. The execution environment may be provided by one or more servers as is known in the art. The server may comprise, for example, a web server, an application server, a proxy server, a network server, and/or a server pool. Such a server accepts requests for application services and executes one or more of applications 132 to provide such services to any number of client devices.

Application server instance 130 and persistency 110 may comprise a production system which is deployed by an enterprise to service incoming user requests. Application server instance 130 is connected to schema 112. During operation, users 120 request functionality from an application 132 executing on application server instance 130, and, using metadata of runtime buffer 134 describing the structures of view and tables, the application 132 issues corresponding queries to schema 112. Accordingly, applications 132 are developed to access a database system implementing view schema 112 and data schema 116 as shown in FIG. 1. In the example below, view schema 112 and data schema 116 of FIG. 1 will be referred to elements of a current database version.

Persistency 110 also includes "Green" view schema 114. Schema 114 is identical to schema 112 and may be deployed into persistency upon installation. As will be described below, all changes to database objects, tables, views, stored procedures required by a database version update are eventually applied to both of schemas 112 and 114.

Figure 2:
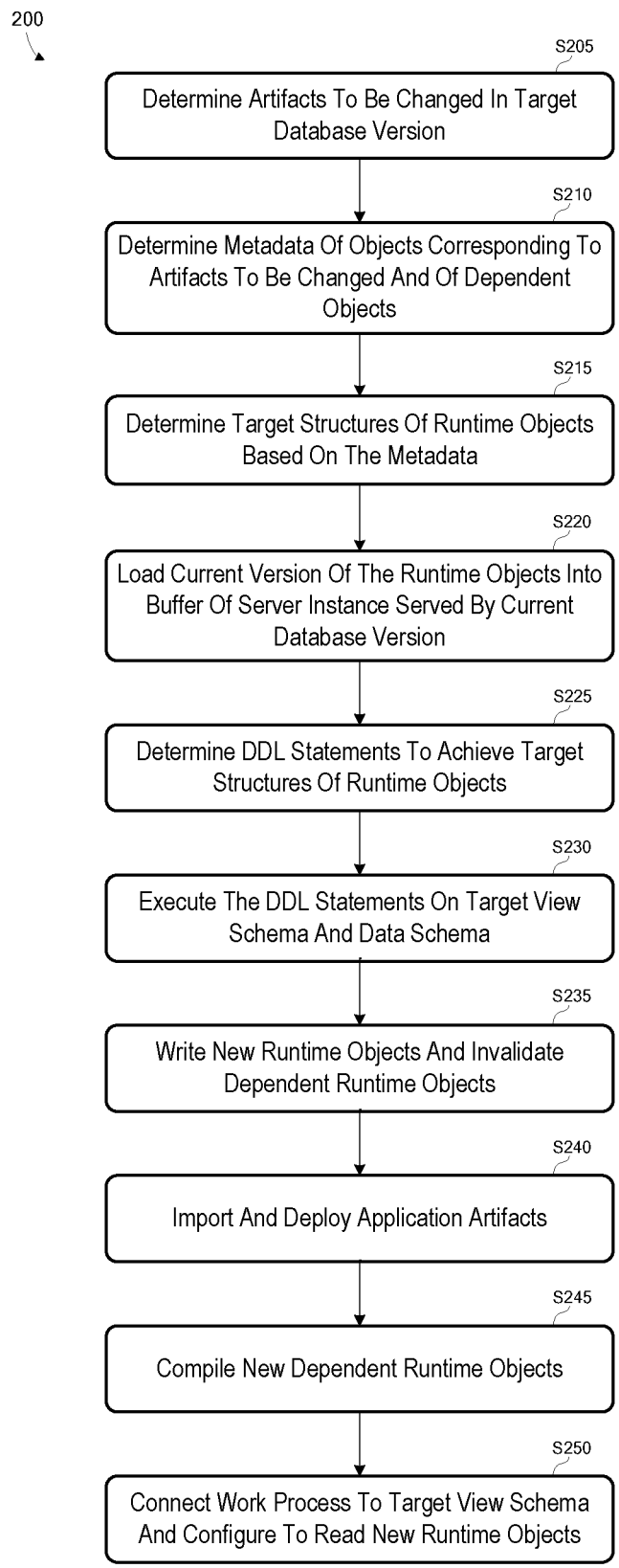
FIG. 2 is a flow diagram of a process to update a database to a target version according to some embodiments.

FIG. 2 is a flow diagram of process 200 to update a current database version to a target database version according to some embodiments. Process 200 and the other processes described herein may be performed using any suitable combination of hardware and software. Software program code embodying these processes may be stored by any non-transitory tangible medium, including a fixed disk, a volatile or non-volatile random access memory, a DVD, a Flash drive, or a magnetic tape, and executed by any number of processing units, including but not limited to processors, processor cores, and processor threads. Such processors, processor cores, and processor threads may be implemented by a virtual machine provisioned in a cloud-based architecture. Embodiments are not limited to the examples described below.

Initially, at S205, artifacts to be changed in a target database version are determined. These artifacts may include to-be deployed changed reports, classes and database objects. S205 may comprise inspecting the changes (i.e., the delta between the current database version and the target database version) to be deployed.

Figure 3:
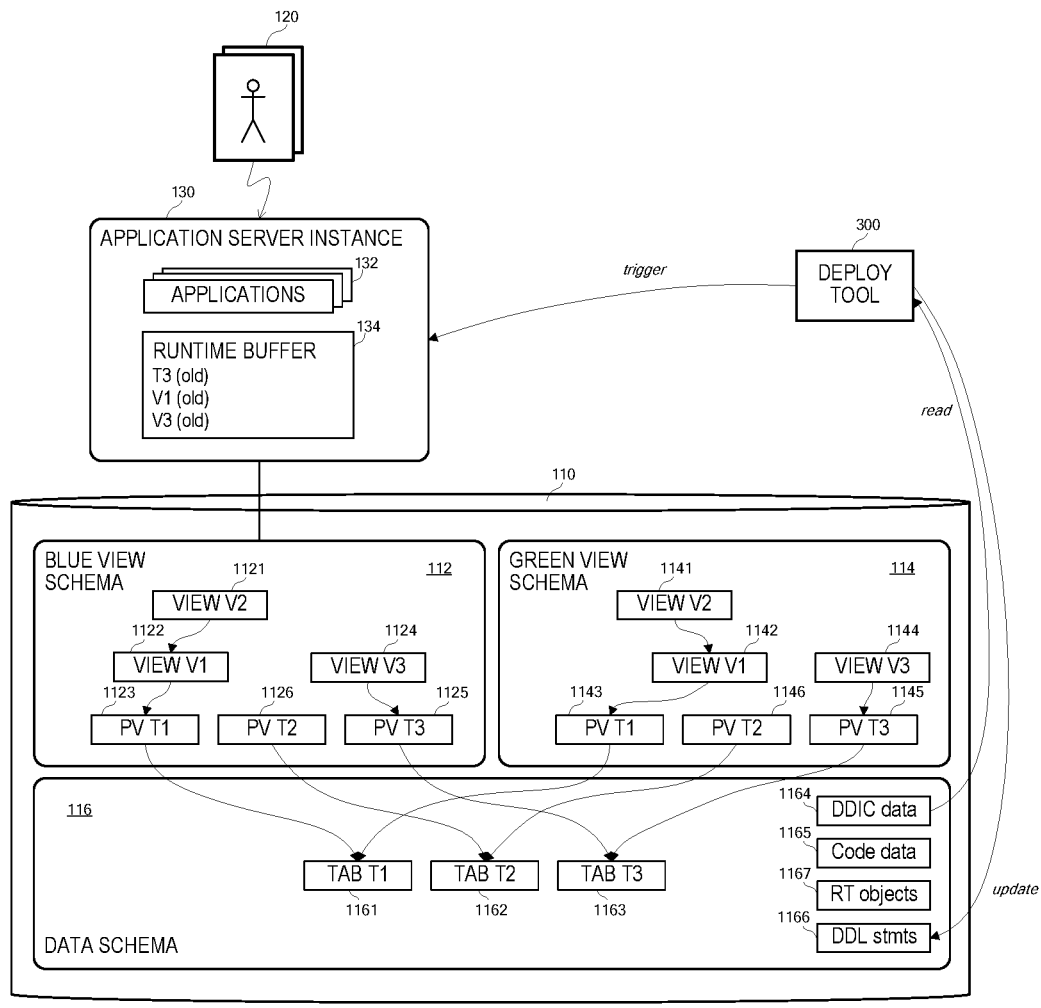
FIG. 3 illustrates deployment of a target database version while serving incoming user requests at a current database version according to some embodiments.

FIG. 3 illustrates deploy tool 300 according to some embodiments. Deploy tool 300 may be executed by a dedicated system (for example, a separate application server instance). Deploy tool 300 may be provided with a list of application content of the target database version which is to be changed in or to added to persistency 110.

According to the present example, it will be assumed that the update requires extending Tab T3 to include a new field FN. Moreover, View V3, which reads from Tab T3, is modified to read from field FN. View V1, which reads from Tab T1, is modified to also read from Tab T2. Additionally, a class/report R1 which uses View V3 is modified to use FN, and some reports R2 . . . RN may depend on database structures modified due to the update of Tab T3, View V1 and View V3. Based on the foregoing, deploy tool 300 identifies report R1, Tab T3, View V1 and View V3 at S205 as artifacts to be changed.

Metadata of objects which correspond to the artifacts to be changed is determined at S210. As illustrated in FIG. 3, deploy tool 300 accesses data dictionary (i.e., DDIC) objects from DDIC data 1164 stored in data schema 116 and identifies metadata of DDIC objects which correspond to the artifacts to be changed and on DDIC objects which depend on the artifacts to be changed. For example, if a structure or data element is changed, all tables using the structure or data element are identified at S210. Deploy tool 300 therefore determines the metadata of DDIC objects corresponding to report R1, Tab T3, View V1 and View V3 at S210. Information regarding which objects depend on modified DDIC objects can be read from application server dependency data according to some embodiments.

At S215, the target structures of runtime objects are determined based on the object metadata determined at S210. Continuing the present example, deploy tool 300 may determine the target structures of Tab T3 (i.e., adds FN), View V3 (i.e., reads from FN), View V1 (i.e., reads from Tab T2). Since View V2 is a dependent object of modified View V1, View V2 is also identified at S215. S215 may generate a list of change objects, those which are part of the deployed delta and those which depend thereon (e.g., views which depend on a changed table, a table which uses a changed structure or data element).

At S220, the current versions of the identified runtime objects are loaded into a buffer of a server instance served by the current database version. For example, deploy tool 300 may trigger application server instance 130 to load the current runtime object versions of the change objects from RT objects storage 1167 of data schema 116 to runtime buffer 134 if not there already. As shown in FIG. 1, runtime buffer 134 stores old versions of runtime objects of Tab T3 and View V1. Accordingly, at S220, those runtime objects need not be loaded into runtime buffer 134 even though they correspond to identified change objects. Application server instance 130 may also be triggered to load R1 and dependent reports R2 . . . RN into buffer 134 at S220.

Loading the to-be-changed runtime objects into buffer 134 advantageously allows applications 132 to continue using these runtime objects even after updated runtime objects of the target database version are generated and written over the to-be-changed runtime objects in RT objects storage 1167. At this point, access to RT objects storage 1167 is disabled for work processes accessing view schema 112.

Next, at S225, DDL statements for changing the current versions of the identified runtime objects to the structure of their desired target versions are determined. DDL statements may be determined to add field FN to Tab T3, add field FN to projection view PV T3, change View V3 to read from field FN, and change View V1 to read from Tab T2. Deploy tool 300 may compute the DDL statements (e.g., alter table add field, drop/create view) and write the DDL statements to DDL statements storage 1166.

Figure 4:
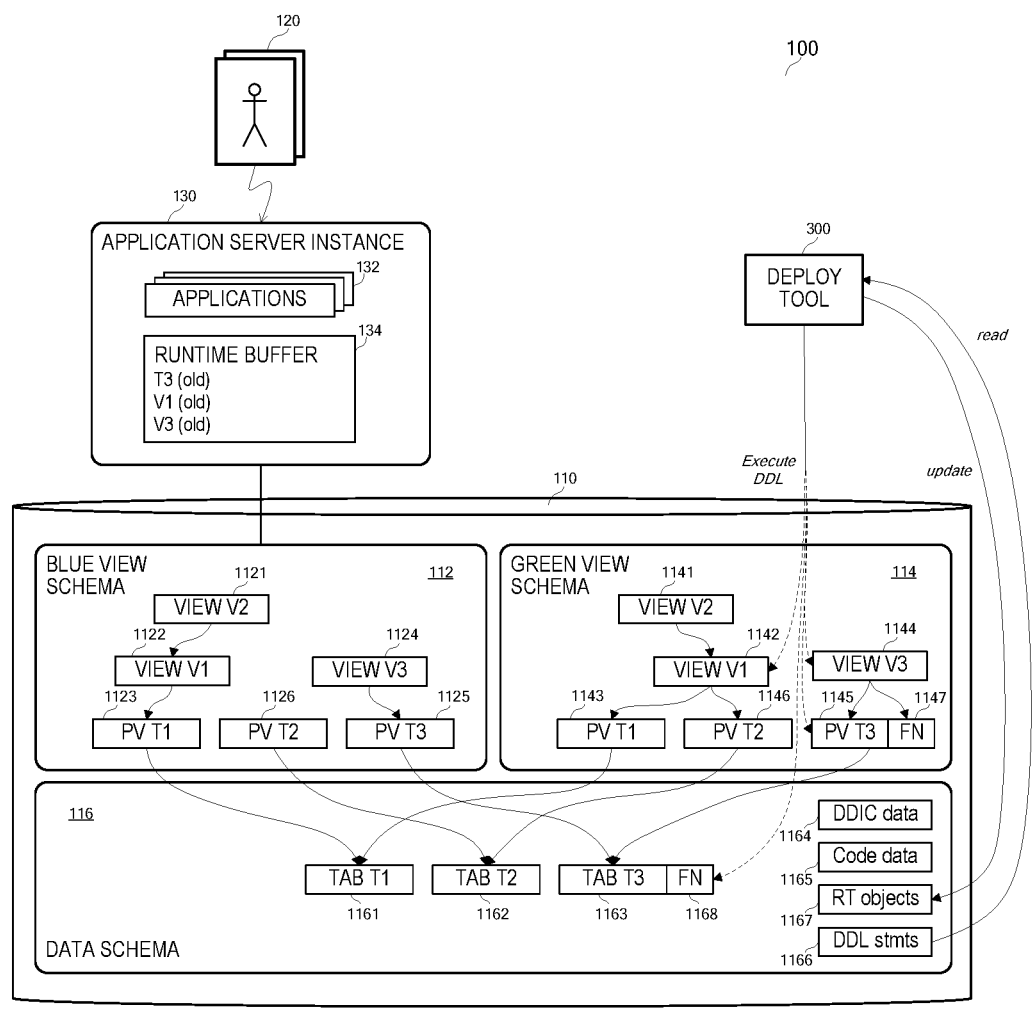
FIG. 4 illustrates deployment of a target database version while serving incoming user requests at a current database version according to some embodiments.

The DDL statements are executed on the target view schema and the data schema at S230. As illustrated in the example of FIG. 4, deploy tool 300 may read the DDL statements from DDL statements storage 1166 and connect to Green view schema 114 to execute the DDL statements on, in the present example, data schema 116 and view schema 114. Such execution adds field FN 1168 to Tab T3 1163 of data schema 116 and adjusts projection view PV T3 1145 of schema 114 to include field FN 1147. Moreover, View V3 1144 is altered to read from field FN 1147 and View V1 1142 is altered to view PV T2 1146.

At S235, new runtime objects corresponding to the modified artifacts (e.g., reports, classes and UI definitions) are written to RT objects table 1167. Such writing does not overwrite the prior versions of the new runtime objects which are stored in buffer 134. Any dependent (but unchanged) runtime objects of reports and classes are marked as invalid.

Figure 5:
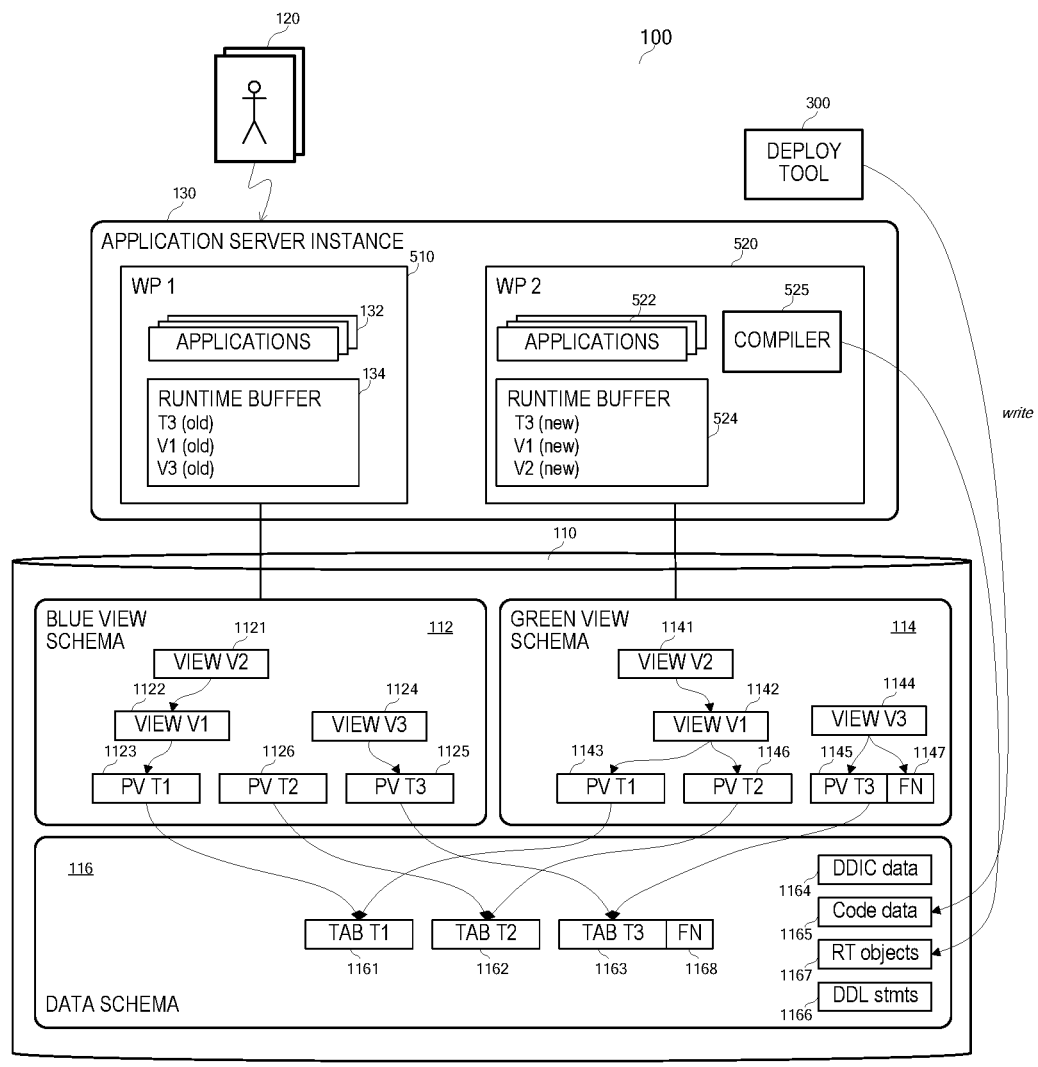
FIG. 5 illustrates deployment of a target database version while serving incoming user requests at a current database version according to some embodiments.

Deploy tool 300 deploys reports, classes, UI definitions, etc. to code data tables 1165 at S240, as illustrated in FIG. 5. For example, S240 may include writing a new version of report R1, while invalidating related report R1 runtime information.

At S245, compiler 525 compiles new versions of the invalidated dependent runtime objects. Such compilation may result in storage of the new versions of the structures of the dependent runtime objects in runtime buffer 524 of work process 520. Runtime buffer 134 of work process 510 continues to store old versions of runtime object structures.

Next, at S250, work process 520 is connected to target view schema 114 and configured to read new runtime objects storage 1167. For example, when a user session executed by a work process connected to schema 112 completes, the work process is re-configured to connect to schema 114. The switch is therefore done per user in some embodiments. After the switch, the switched work process uses the new version of the runtime objects in its runtime buffer and in RT objects storage 1167. Additionally, any invalidated runtime objects are compiled, stored in the RT objects storage 1167, and written to the runtime buffer of the switched work process.

Figure 6:
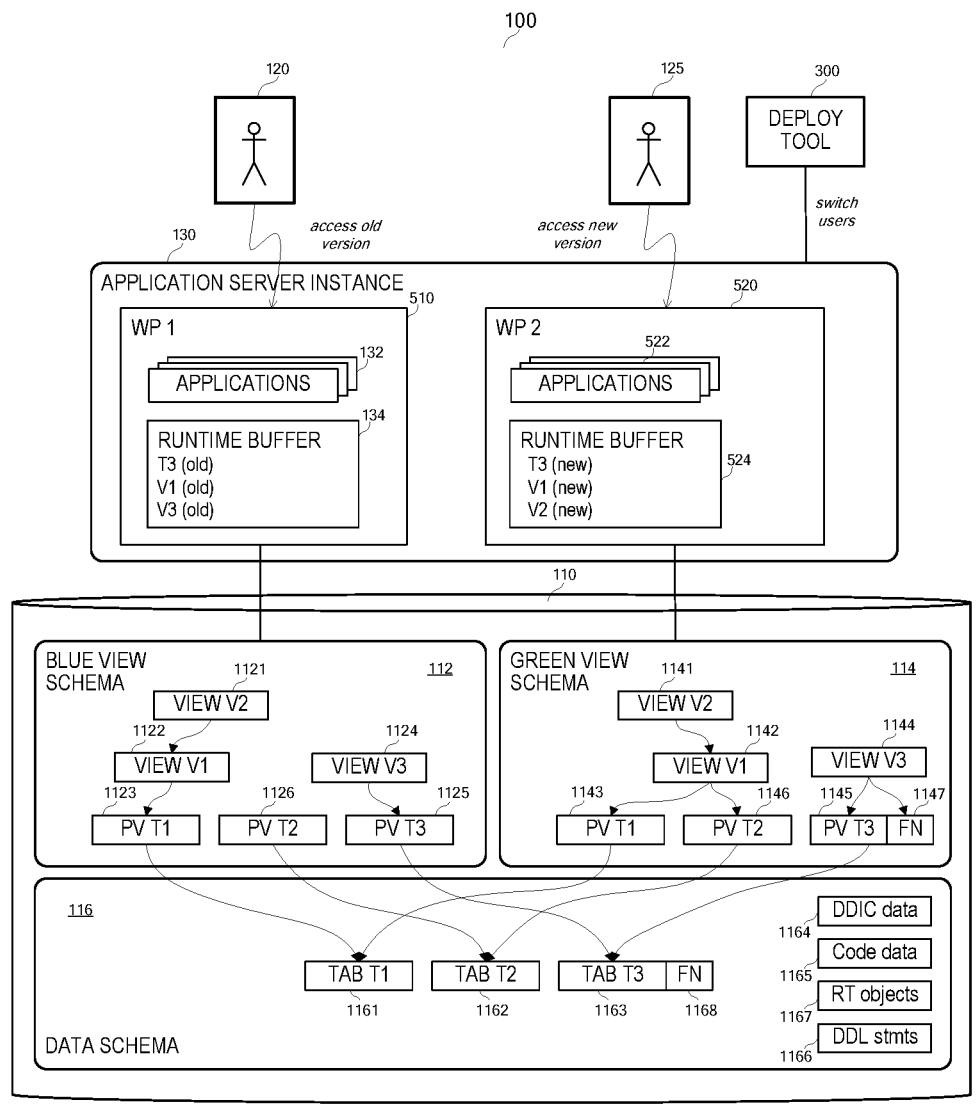
FIG. 6 illustrates simultaneous serving of incoming user requests using a target database version and a current database version according to some embodiments.

As shown in FIG. 6, during the switching of work processes, work processes 510 and 520 both execute on application server instance 130 based on respective dedicated runtime buffers 134 and 524. Work process 510 uses runtime buffer 134 to access schema 112 and can therefore operate with the non-updated database version, using the old version of reports and runtime information stored in buffer 134. Work process 520 uses runtime buffer 524 to access schema 114 and can therefore operate with the target (i.e., updated) database version.

According to some embodiments, a time-out period (e.g., 10 min, 1 h) is established by which all user sessions must be switched to the target database version, even if a session is being served by schema 112. Such sessions are terminated at the conclusion of the time-out period. Moreover, it is ensured that a user session served by schema 114 does not subsequently connect to schema 112.

Figure 7:
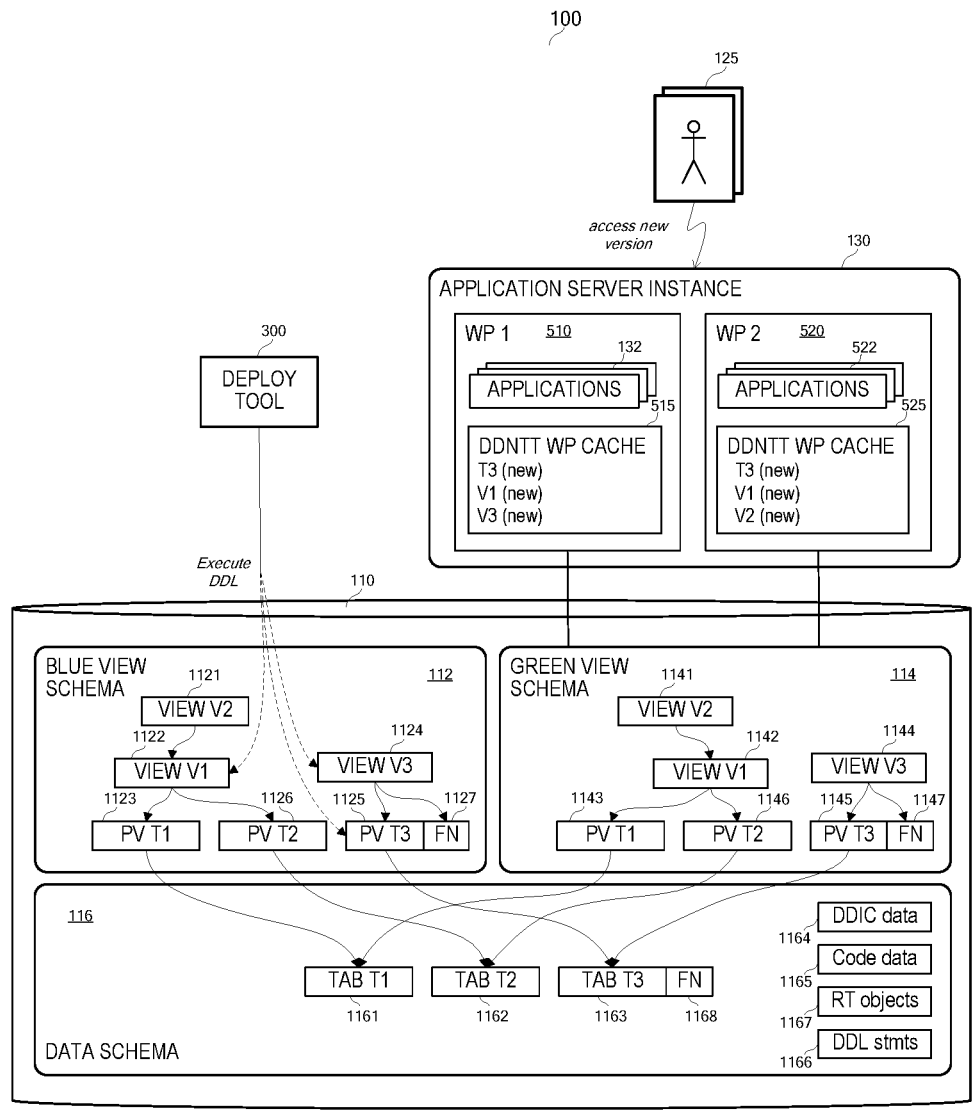
FIG. 7 illustrates serving incoming user requests using a target database version according to some embodiments.

FIG. 7 depicts completion of transitioning all user sessions onto the target database version and all work processes to view schema 116. FIG. 7 also shows deploy tool 300 connecting to view schema 112 to execute the previously-stored DDL statements on view schema 112. Any stored DDL statements on data schema 116 are not executed, since the prior execution of the DDL statements already modified data schema 116 (e.g., by adding field FN 1168 to Tab T3 1163). The DDL statements may be deleted from DDL statements 1166 after execution. Old entries in RT objects storage 1167, if any, may also be deleted.

Execution of the DDL statements on view schema 112 is intended to modify schema 112 to mirror schema 114. Such mirroring facilitates a future database version update from the version currently accessed by schema 114 to a new version which will be accessed by view schema 112. Maintaining the mirroring requires replication of any subsequent changes to schema 114 to schema 112.

These subsequent changes may include deployment of an updated database version as described above but may also be caused by code which generates DDIC objects or database objects during use or configuration. If a report generates a DDIC object within a work process connected to view schema 114, the executed DDL statements (excluding those targeting tables and indexes and other objects in the data schema) are also executed on view schema 112 to keep the view schemas in sync. Some embodiments periodically check for deviations between the view schemas and resolve any deviations.

Figure 8:
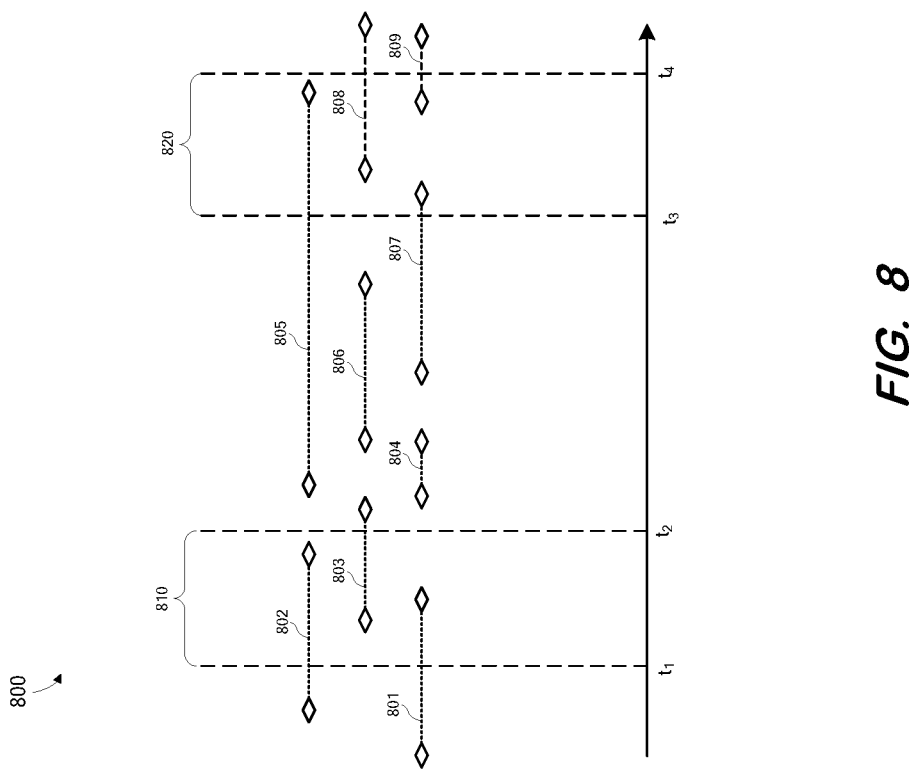
FIG. 8 is a timing diagram showing transitioning of user sessions from a current database version to a target database version according to some embodiments.

FIG. 8 is a timing diagram showing transitioning of user sessions from a current database version to a target database version according to some embodiments. User sessions 801-807, represented by dotted lines, are served by a current database version while user sessions 808, 809 are served by a target database version.

User sessions 801, 802, and 803 are each associated with different users. Sessions 801, 804, 807 and 809 are associated with a same user and may involve interactions between that user and different respective ones of applications 132 or 522. Similarly, sessions 802 and 805 are associated with a same user and sessions 803, 806 and 808 are associated with a same user.

According to some embodiments, each user session is associated with a tag indicating whether the session is running on a current database version or a target database version. If the tag for a session indicates the session is running on the current database version, the session is connected to view schema 112 and reads the current versions of to-be-updated runtime objects from runtime buffers. If the tag for a session indicates the session is running on the target database version, the session is connected to view schema 114 and reads the target version's runtime objects from runtime buffers. Reading the target version's runtime objects may include compiling runtime objects and storing them in the runtime buffers for those runtime objects which were invalidated during the update. These objects include imported changed reports and classes, and reports and classes which depend on a changed DDIC object.

During period 810, it is ensured that all sessions are capable of using the current database version, even if database artifacts are updated. This may include ensuring that the associated runtime buffers include structures of runtime objects that will be modified in the new database version. The update (i.e., determination of DDL statements at S225) may then begin at $t_2$. Once the update is complete at $t_3$, any new sessions (i.e., 808, 809) arising are connected to the target database version. After time-out period 820, at $t_4$, any existing user sessions which are connected to the current (old) database version are terminated.

Figure 9:
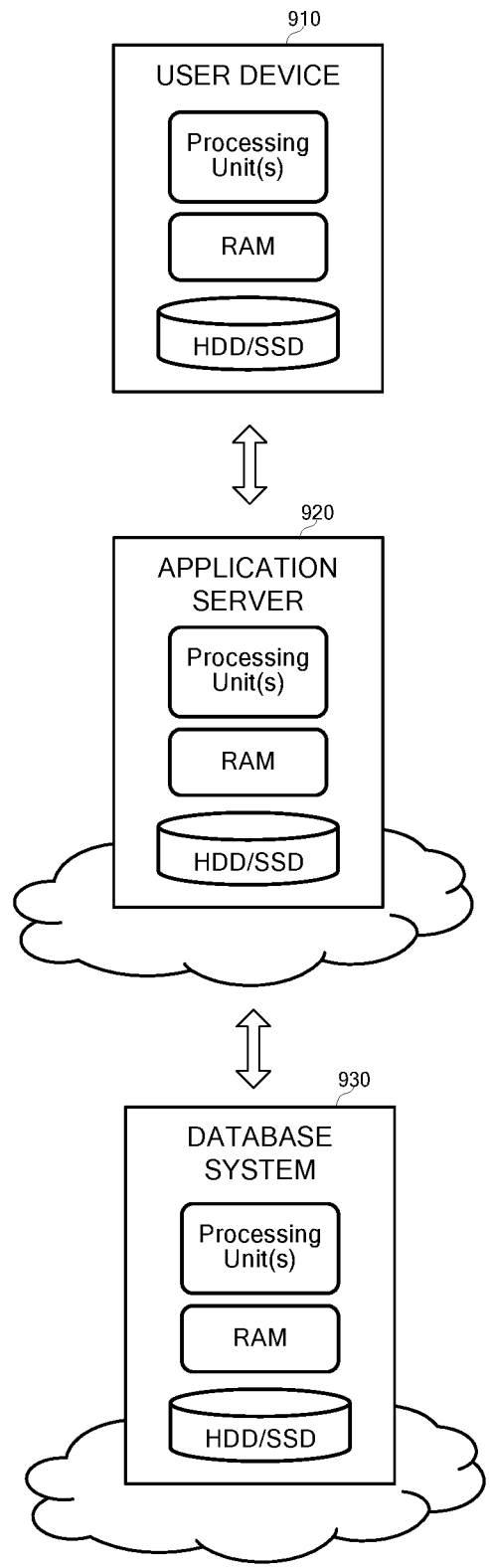
FIG. 9 is a block diagram of cloud-based servers of a system in which a current database version may be updated to a target database version according to some embodiments.

FIG. 9 illustrates a cloud-based database deployment according to some embodiments. The illustrated components may comprise cloud-based compute resources residing in one or more public clouds providing self-service and immediate provisioning, autoscaling, security, compliance and identity management features.

User device 910 may interact with an application executing on application server 920, for example via a Web Browser executing on user device 910, in order to create, read, update and delete data managed by database system 930. Database system executes a first database version including a data schema and view schema as described herein.

The database version may be updated within database system 930 as also described herein in order to conform to a second version of the application executing on application server 925. Once the database version is updated, incoming requests from user device 910 may be routed to the updated database version in order to create, read, update and delete data managed by database system 930.

The foregoing diagrams represent logical architectures for describing processes according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions. For example, any computing device used in an implementation of a system according to some embodiments may include a processor to execute program code such that the computing device operates as described herein.

All systems and processes discussed herein may be embodied in program code stored on one or more non-transitory computer-readable media. Such media may include, for example, a hard disk, a DVD-ROM, a Flash drive, magnetic tape, and solid-state Random Access Memory (RAM) or Read Only Memory (ROM) storage units. Embodiments are therefore not limited to any specific combination of hardware and software.

Embodiments described herein are solely for the purpose of illustration. Those in the art will recognize other embodiments may be practiced with modifications and alterations to that described above.

What is claimed is:

1. A system comprising:
   a memory storing processor-executable program code; and
   at least one processing unit to execute the processor-executable program code to cause the system to:
   determine one or more tables of a first data schema of a first database version, each of the one or more tables being associated with a respective table name and a respective first table structure in the first database version and associated with the same respective table name and a respective second table structure different from the respective first table structure in a second data schema of a second database version;
   determine one or more views of a first view schema of the first database version, each of the one or more views being associated with a respective view name and a respective first view structure in the first database version and associated with the same respective view name and a respective second view structure different from the respective first view structure in the second database version;
   determine runtime objects of the one or more tables and the one or more views of the first database version;
   load the runtime objects of the one or more tables and the one or more views of the first database version into a runtime buffer of a first work process connected to the first view schema; and
   while the first work process serves first incoming requests using the runtime objects loaded into the runtime buffer and the first view schema:
   change the structure of the one or more tables to their respective second table structures;
   in a second view schema which is a copy of the first view schema, change the structure of the one or more views to their respective second view structures;
   connect a second work process to the second view schema; and
   serve second incoming requests with the second work process, the changed views of the second view schema and the changed one or more tables.

2. The system according to claim 1, the at least one processing unit to execute the processor-executable program code to cause the system to:
   modify the first view schema to match the second view schema after the second work process is connected to the second view schema.

3. The system according to claim 2, wherein change of the structure of the one or more views comprises:
   execution of a plurality of Data Description Language statements against the second view schema,
   wherein modification of the first view schema to match the second view schema comprises execution of the plurality of Data Description Language statements against the first view schema.

4. The system according to claim 3, the at least one processing unit to execute the processor-executable program code to cause the system to:
   disconnect the first work process from the first view schema before the modification of the first view schema.

5. The system according to claim 1, wherein the second view schema is identical to the first view schema when the runtime objects are loaded into the runtime buffer.

6. The system according to claim 1, wherein determination of runtime objects of the one or more tables and the one or more views comprises:
   determination of metadata of objects corresponding to the one or more tables and the one or more views and of dependent objects; and
   determination of the runtime objects based on the metadata.

7. A computer-implemented method comprising:
   determining one or more tables of a first data schema of a first database version, each of the one or more tables being associated with a respective table name and a respective first table structure in the first database version and associated with the same respective table name and a respective second table structure different from the respective first table structure in a second data schema of a second database version;
   determining one or more views of a first view schema of the first database version, each of the one or more views being associated with a respective view name and a respective first view structure in the first database version and associated with the same respective view name and a respective second view structure different from the respective first view structure in the second database version;
   determining runtime objects of the one or more tables and the one or more views of the first database version;
   loading the runtime objects of the one or more tables and the one or more views of the first database version into a runtime buffer of a first work process connected to the first view schema;
   while the first work process serves first incoming requests using the runtime objects loaded into the runtime buffer and the first view schema:
      changing the structure of the one or more tables to their respective second table structures;
      in a second view schema which is a copy of the first view schema, changing the structure of the one or more views to their respective second view structures;
      connecting a second work process to the second view schema; and
      serving second incoming requests with the second work process, the changed views of the second view schema and the changed one or more tables.

8. The method according to claim 7, further comprising:
   modifying the first view schema to match the second view schema after the second work process is connected to the second view schema.

9. The method according to claim 8, wherein changing the structure of the one or more views comprises:
   executing a plurality of Data Description Language statements against the second view schema,
   wherein modifying the first view schema to match the second view schema comprises executing the plurality of Data Description Language statements against the first view schema.

10. The method according to claim 9, further comprising:
   disconnecting the first work process from the first view schema before the modification of the first view schema.

11. The method according to claim 7, wherein the second view schema is identical to the first view schema when the runtime objects are loaded into the runtime buffer.

12. The method according to claim 7, wherein determining the runtime objects of the one or more tables and the one or more views comprises:
   determining metadata of objects corresponding to the one or more tables and the one or more views and of dependent objects; and
   determining the runtime objects based on the metadata.

13. A computer-readable medium storing processor-executable program code, the program code executable by a computing system to:
   determine one or more tables of a first data schema of a first database version, each of the one or more tables being associated with a respective table name and a respective first table structure in the first database version and associated with the same respective table name and a respective second table structure different from the respective first table structure in a second data schema of a second database version;
   determine one or more views of a first view schema of the first database version, each of the one or more views being associated with a respective view name and a respective first view structure in the first database version and associated with the same respective view name and a respective second view structure different from the respective first view structure in the second database version;
   determine runtime objects of the one or more tables and the one or more views of the first database version;
   load the runtime objects of the one or more tables and the one or more views of the first database version into a runtime buffer of a first work process connected to the first view schema;
   while the first work process serves first incoming requests using the runtime objects loaded into the runtime buffer and the first view schema:
      change the structure of the one or more tables to their respective second table structures;
      in a second view schema which is a copy of the first view schema, change the structure of the one or more views to their respective second view structures;
      connect a second work process to the second view schema; and
      serve second incoming requests with the second work process, the changed views of the second view schema and the changed one or more tables.

14. The medium according to claim 13, the program code executable by a computing system to:
   modify the first view schema to match the second view schema after the second work process is connected to the second view schema.

15. The medium according to claim 14, wherein change of the structure of the one or more views comprises:
   execution of a plurality of Data Description Language statements against the second view schema,
   wherein modification of the first view schema to match the second view schema comprises execution of the plurality of Data Description Language statements against the first view schema.

16. The medium according to claim 15, the program code executable by a computing system to:
   disconnect the first work process from the first view schema before the modification of the first view schema.

17. The medium according to claim 13, wherein the second view schema is identical to the first view schema when the runtime objects are loaded into the runtime buffer.

18. The medium according to claim 13, wherein determination of runtime objects of the one or more tables and the one or more views comprises:

determination of metadata of objects corresponding to the one or more tables and the one or more views and of dependent objects; and determination of the runtime objects based on the metadata.

\* \* \* \* \*